(12) United States Patent
Kim

(10) Patent No.: US 9,251,290 B2
(45) Date of Patent: Feb. 2, 2016

(54) METHOD, SERVER, TERMINAL DEVICE, AND COMPUTER-READABLE RECORDING MEDIUM FOR SELECTIVELY REMOVING NONDETERMINISM OF NONDETERMINISTIC FINITE AUTOMATA

(71) Applicant: INFNIS NETWORKS, INC., Seoul (KR)

(72) Inventor: Min Sik Kim, Pullman, WA (US)

(73) Assignee: INFNIS NETWORKS, INC., Seoul (KR)

( * ) Notice: Subject to any disclaimer, the term of this patent is extended or adjusted under 35 U.S.C. 154(b) by 0 days.

(21) Appl. No.: 14/391,503

(22) PCT Filed: Dec. 24, 2012

(86) PCT No.: PCT/KR2012/011372
§ 371 (c)(1),
(2) Date: Oct. 9, 2014

(87) PCT Pub. No.: WO2013/154252
PCT Pub. Date: Oct. 17, 2013

(65) Prior Publication Data
US 2015/0074104 A1  Mar. 12, 2015

(30) Foreign Application Priority Data
Apr. 13, 2012  (KR) .......................... 10-2012-0038763

(51) Int. Cl.
*G06F 17/00* (2006.01)
*G06F 17/30* (2006.01)
(52) U.S. Cl.
CPC .... *G06F 17/30964* (2013.01); *G06F 17/30985* (2013.01)
(58) Field of Classification Search
CPC ....................... G06F 17/30985; G06K 9/00973
USPC ...................................................... 706/12, 45
See application file for complete search history.

(56) References Cited

U.S. PATENT DOCUMENTS

2005/0273450 A1* 12/2005 McMillen et al. ................. 707/1
2006/0242123 A1* 10/2006 Williams .......................... 707/3

FOREIGN PATENT DOCUMENTS

| JP | 2010-186412 A | 8/2010 |
| KR | 10-0323384 | 1/2002 |
| KR | 10-0475266 | 2/2005 |

OTHER PUBLICATIONS

Lee, et al., Extracting Maximal Similar Paths Between Two XML Documents using Sequential Pattern Mining, Journal of Korean Institute of Information Scientists and Engineers, vol. 31, No. 5 (Oct. 30, 2004), pp. 553-566.
Bruggemann-Klein, Regular Expressions into Finite Automata, Theoretical Computer Science 120 (1993), 197-213.

* cited by examiner
(Continued)

*Primary Examiner* — David Vincent
(74) *Attorney, Agent, or Firm* — Husch Blackwell LLP

(57) ABSTRACT

A method for selectively eliminating nondeterministic elements of NFA is disclosed. The method includes steps of: (a) determining a specific state calculated to have a highest arrival probability through a transition from a current state among all states in the NFA as a current highest probability state; (b) determining whether there exists at least one common transition between a first set of transitions including at least one transition moving the current highest probability state to a state i and a second set of transitions including at least one transition moving the current highest probability state to a state j in the NFA; and (c) excluding the at least one common transition between the first and the second sets of transitions and creating a state k which is arrived as a result of moving from the current highest probability state through the at least one common transition.

23 Claims, 6 Drawing Sheets

FIG. 6

| INPUT STRING | ACTIVE STATES OF NFA IN FIG. 1 | ACTIVE STATES OF NFA IN FIG. 5 |
|---|---|---|
| g, · · ·, m | STATE 0 | STATE 0 |
| b | STATE 0, STATE 1, STATE 2 | STATE 0, STATE 6 |
| a | STATE 0, STATE 1, STATE 3, STATE 4 | STATE 0, STATE 1, STATE 7 |
| b | STATE 0, STATE 1, STATE 2, STATE 3, STATE 5 | STATE 0, STATE 3, STATE 5, STATE 6 |
| 0, · · ·, f | STATE 0 | STATE 0 |

METHOD, SERVER, TERMINAL DEVICE, AND COMPUTER-READABLE RECORDING MEDIUM FOR SELECTIVELY REMOVING NONDETERMINISM OF NONDETERMINISTIC FINITE AUTOMATA

CROSS REFERENCE TO RELATED APPLICATIONS

This application is a U.S. National Phase Application of International Application PCT Application No. PCT/KR2012/011372 filed on Dec. 24, 2012, which claims the benefit of priority from Korean Patent Application No. 10-2012-0038763 filed on Apr. 13, 2012. The disclosures of International Application PCT Application No. PCT/KR2012/011372 and Korean Patent Application No. 10-2012-0038763 are incorporated herein by reference.

FIELD OF THE INVENTION

The present invention relates to a method, a server, a terminal device, and a computer-readable recording medium for selectively eliminating nondeterminism of nondeterministic finite automata (NFAs); and more particularly, to the method, the server, the terminal device, and the computer-readable recording medium for selecting transitions that cause increase of active states as a cause of decline in string searching speed of the NFAs and eliminating their nondeterministic elements to allow limited memory resources to be effectively used.

BACKGROUND OF THE INVENTION

A regular expression, as a formal language used to express a sequence of strings with specific rules, is simply called a regex and is widely used to compare, or express to search and find, strings by using processing devices such as computers. According to a formal language theory in a field of computer science that deals with regular expressions, the regular expression is based on ∈ which represents an empty string and only one character (e.g., a, b, or c) and various patterns of strings may be represented by combining characters in use of operators such as concatenation (e.g., abc, bbbb, or baba), selection (e.g., ab|c, or ab|ba), repetition (e.g., c*). Further, because it may occur that regular expressions are too long or complicate, new regular expressions in a form of adding various extension grammars have been introduced for convenience. For example, the new regular expressions include Perl compatible regular expressions (PCRE) that are implemented according to a method used in Perl, a computer programming language, POSIX regular expressions defined in the standards for UNIX-like computer operating system environments, etc.

Because search time and memory usage largely depend on under which method search is performed even in searching strings by using regular expressions, studies on how to search strings effectively by using regular expressions are actively conducted.

First of all, a method for searching a string by converting a regular expression to nondeterministic finite automata (NFAs) as one of conventional technologies for string search by using regular expressions has been introduced.

FIG. 1 is a drawing exemplarily representing general NFA converted under conventional technology. In FIG. 1, circles in which there are numbers represent states of NFA and each arrow and its character in parallel indicate a transition from one state to the other state along the arrow if the character is inputted. Further, a concentric circle among all the circles where there are numbers shows a final state. If the final state is reached as a result of a transition(s) starting from the initial state, it means that a desired string is found. By referring to FIG. 1, the desired string may be either of three characters including only 'a' or 'b' in sequence or three characters 'bad' in sequence and it may be expressed as "[ab]{3}|bad" in a regular expression and also may be illustrated in a form of NFA as shown in FIG. 1.

A look at a course of searching a desired string in an input string "gjekf3jmbab0d1f" by using the NFA illustrated in FIG. 1 will be taken.

First, while all the characters in the input string are read one by one, whether one state can be moved to another state is tested, starting from a state 0 as an initial state. Because "g" is inputted as the first character of the input string and there is no transition moving from the state 0 to another state by corresponding to the entry of "g", the state continuously remains the state 0. Since there is no transition corresponding to the second character "j" as well, the next character is read while it remains the state 0. Accordingly, in such a case, a number of a state required to test a state transition, i.e., an active state, is totally one since the active state only includes the state 0.

If the front part of the input string, i.e., "gjekf3 µm", is inputted while the state continuously remains the state 0 in such a way, the character next to them is "b". If "b" is inputted in the NFA in FIG. 1, there are transitions moving from the state 0 to states 1 and 2. Therefore, the state 0 moves to the states 1 and 2, respectively. Accordingly, just after "b" is inputted, the states required to test the state transition, i.e., the active states, become states 0, 1, and 2, which are totally three states.

The following inputted character becomes "a". If "a" is inputted, there exist transitions through which the states 0, 1, and 2 as the active states move to states 1, 3, and 4, respectively, in the NFA in FIG. 1, so that the states 0, 1, and 2 move to states 1, 3, and 4, respectively. Accordingly, just after characters "ba" are inputted, the states required to test the state transition, i.e., the active states, become the states 0, 1, 3, and 4, which are totally four states.

The following inputted character is "b". If the character "b" is inputted, there exist transitions through which the state 0 as the active state moves to the states 1 and 2, the state 1 as the active state to the state 3, and the state 3 as the active state to a state 5, in the NFA in FIG. 1, so that the state 0 moves to the states 1 and 2, the state 1 moves to the state 3, and the state 3 moves to the state 5. Accordingly, just after "bab" are inputted, the states required to test the state transition, the active states, are states 0, 1, 2, 3, and 5, which become totally five. As this caused the state to reach the final state of the NFA in FIG. 1, a desired string from the given input string, i.e., "bab", can be dealt with to be found.

As explained above, there may exist a transition through which one state moves to two or more states in the NFA by corresponding to an inputted character according to the conventional technology illustrated in FIG. 1. Accordingly, if a desired string is searched while characters included in an input string are inputted one by one by using the NFA according to the conventional technology, the number of the states required to test, i.e., the number of active states, increases. Whenever the characters included in the input string are inputted, all the active states must be tested. Therefore, there occurs a problem of declining the search speed as much as the number of increased active states.

As another example of conventional technologies that search a desired string by using regular expressions, a method for searching the desired string by converting NFA to deterministic finite automaton (DFA) has been introduced as well.

When the desired string is searched by using the DFA, there is an advantage that it may improve the search speed and simplify a course of processing an input string because the number of the active states is always kept as one, but there exists a problem of requiring considerable memory resources in a course of converting the NFA to the DFA. In addition, if there are multiple desired strings to search, i.e., regular expressions, or if their patterns are complicated, the memory usage for processing them drastically increases and there is even a limit that it is impracticable to process multiple or long-patterned regular expressions by using the DFA. In particular, as the demand for computer security is recently increasing, it is general to search strings by integrating various patterns of strings to search, but in such a case, it may be impossible to perform string search by using the DFA in normal computer memory resources because corresponding regular expressions may be so complicated.

To solve the problem that may occur by the method for searching strings by using the general DFA, a method for reducing memory usage by compressing the DFA has been introduced. In other words, it is a method for integrating multiple states whose transitions are similar or integrating multiple transitions commonly used at several states into one transition by gathering them. However, according to this method, there may occur a case of an impossibility of normally processing input strings or further transition failure because states or transitions which are not completely identical to one another may be integrated. Because the additional memory references are required when such transition failure occurs, even though the memory usage is less than that before compression, the memory reference counts increase more than before compression. As a result, it could not be impossible to prevent the search speed from being declined.

Accordingly, the necessity of a technology for allowing strings to be rapidly searched by minimizing the number of active states and using less memory while the NFA is used.

SUMMARY OF THE INVENTION

It is an object of the present invention to solve all the problems mentioned above.

It is another object of the present invention to reduce the number of active states of nondeterministic finite automaton (NFA) and selectively eliminate nondeterministic elements of the NFA by changing states and transitions of the NFA so as to prevent a state with a high arrival probability among states in the NFA from moving to two or more different states.

It is still another object of the present invention to effectively eliminate the nondeterministic elements of the NFA only within given memory resources by finishing a course of eliminating the nondeterministic elements, if a certain condition, such as a state with a highest probability reaching a final state or the number of total states of the NFA exceeding a preset number, is satisfied.

In accordance with one aspect of the present invention, there is provided a method for being implemented by a server or a terminal, where the server or the terminal include a highest probability state determining part and an active state removing part, to selectively eliminate nondeterministic elements of nondeterministic finite automata (NFA) including steps of: (a) the highest probability state determining part determining a specific state calculated to have a highest arrival probability through a transition from a current state among all states in the NFA as a current highest probability state; (b) the active state removing part determining whether there exists at least one common transition between a first set of transitions including at least one transition moving the current highest probability state to a state i and a second set of transitions including at least one transition moving the current highest probability state to a state j in the NFA; and (c) the active state removing part excluding the at least one common transition between the first and the second sets of transitions, if being determined to exist, and creating a state k which is arrived as a result of moving from the current highest probability state through a set of common transitions composed of the at least one common transition, wherein the state k is newly added in the NFA.

In accordance with another aspect of the present invention, there is provided a method for being implemented by a server or a terminal, where the server or the terminal include a highest probability state determining part and an active state removing part, to selectively eliminate nondeterministic elements of nondeterministic finite automata (NFA) including steps of: (a) the active state removing part determining whether there exists at least one common transition between a first set of transitions including at least one transition moving an initial state to a state i and a second set of transitions including at least one transition moving the initial state to a state j in the NFA; (b) the active state removing part excluding the at least one common transition between the first and the second sets of transitions, if being determined to exist, and creating a state k which is arrived as a result of moving from the initial state through a set of common transitions composed of the at least one common transition, wherein the state k is newly added in the NFA; and (c) the highest probability state determining part calculating a probability of reaching at least one state reachable by moving from the initial state, if an input string including a subject to be searched is acquired, and determining a certain state with a calculated highest probability to be a highest probability state.

In accordance with still another aspect of the present invention, there is provided a server for selectively eliminating nondeterministic elements of nondeterministic finite automata (NFA) including: a highest probability state determining part for determining a specific state calculated to have a highest arrival probability through a transition from a current state among all states in the NFA as a current highest probability state; an active state removing part for determining whether there exists at least one common transition between a first set of transitions including at least one transition moving the current highest probability state to a state i and a second set of transitions including at least one transition moving the current highest probability state to a state j in the NFA; and excluding the at least one common transition between the first and the second sets of transitions, if being determined to exist, and creating a state k which is arrived as a result of moving from the current highest probability state through a set of common transitions composed of the at least one common transition, wherein the state k is newly added in the NFA.

In accordance with still yet another aspect of the present invention, there is provided a server for selectively eliminating nondeterministic elements of nondeterministic finite automata (NFA) including: an active state removing part determines whether there exists at least one common transition between a first set of transitions including at least one transition moving an initial state to a state i and a second set of transitions including at least one transition moving the initial state to a state j in the NFA; and excludes the at least one common transition between the first and the second sets of transitions, if being determined to exist, and creates a state k which is arrived as a result of moving from the initial state through a set of common transitions composed of the at least one common transition, wherein the state k is newly added in the NFA; and a highest probability state determining part calculates a probability of reaching at least one state reachable by moving from the initial state, if an input string including a subject to be searched is acquired, and determines a certain state with a calculated highest probability to be a highest probability state.

In accordance with still yet another aspect of the present invention, there is provided a terminal for selectively eliminating nondeterministic elements of nondeterministic finite automata (NFA) including: a highest probability state determining part for determining a specific state calculated to have a highest arrival probability through a transition from a current state among all states in the NFA as a current highest probability state; an active state removing part for determining whether there exists at least one common transition between a first set of transitions including at least one transition moving the current highest probability state to a state i and a second set of transitions including at least one transition moving the current highest probability state to a state j in the NFA; and excluding the at least one common transition between the first and the second sets of transitions, if being determined to exist, and creating a state k which is arrived as a result of moving from the current highest probability state through a set of common transitions composed of the at least one common transition, wherein the state k is newly added in the NFA.

In accordance with still yet another aspect of the present invention, there is provided a terminal for selectively eliminating nondeterministic elements of nondeterministic finite automata (NFA) including: an active state removing part determines whether there exists at least one common transition between a first set of transitions including at least one transition moving an initial state to a state i and a second set of transitions including at least one transition moving the initial state to a state j in the NFA; and excludes the at least one common transition between the first and the second sets of transitions, if being determined to exist, and creates a state k which is arrived as a result of moving from the initial state through a set of common transitions composed of the at least one common transition, wherein the state k is newly added in the NFA; and a highest probability state determining part calculates a probability of reaching at least one state reachable by moving from the initial state, if an input string including a subject to be searched is acquired, and determines a certain state with a calculated highest probability to be a highest probability state.

BRIEF DESCRIPTION OF THE DRAWINGS

The above and other objects and features of the present invention will become apparent from the following description of preferred embodiments given in conjunction with the accompanying drawings, in which:

FIG. 6 is a diagram showing the result of comparing a method for searching strings by using general NFA in FIG. 1 with that by using the NFA whose nondeterministic elements are selectively eliminated in accordance with the present invention.

DETAILED DESCRIPTION OF THE PREFERRED EMBODIMENTS

Figure 1:
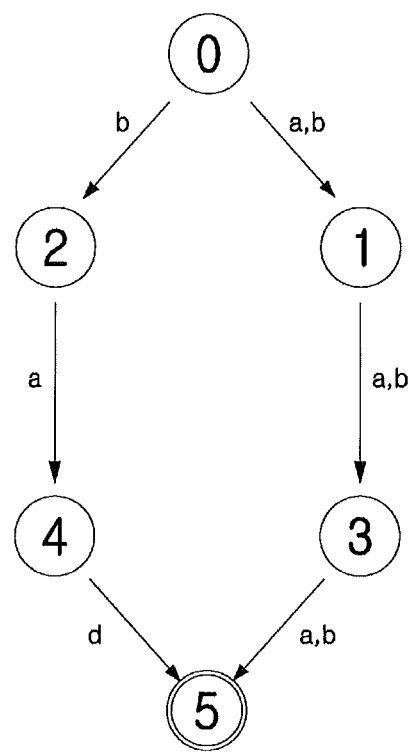
FIG. 1 is a drawing exemplarily showing general nondeterministic finite automaton (NFA) converted according to conventional technology.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of a Server for Searching Strings

An internal configuration of a search server for searching strings that performs important functions to implement the present invention and the functions of its components will be explained below.

In accordance with an example embodiment of the present invention, any device, including a personal computer (e.g., desktop, laptop, etc.), a server, a workstation, a PDA, a web pad, a cellular phone, a smart phone, etc., which has a memory means and micro processors with a calculation ability, may be adopted as the search server 100 for searching strings in accordance with the present invention.

Figure 2:
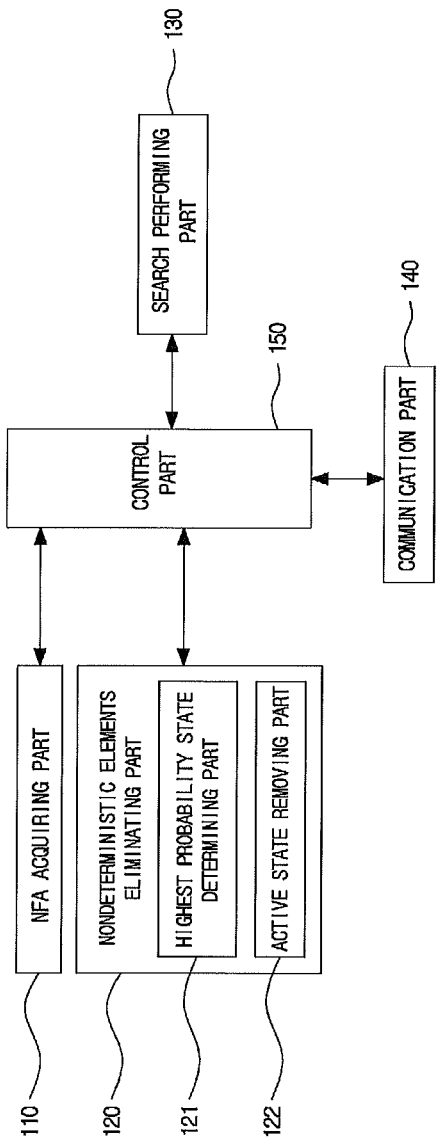
FIG. 2 is a drawing exemplarily showing an internal configuration of a server for searching strings in accordance with an example embodiment of the present invention.

FIG. 2 exemplarily shows an internal configuration of the search server for searching strings in accordance with an example embodiment of the present invention.

By referring to FIG. 2, the search server 100 for searching strings in accordance with an example embodiment of the present invention may include a nondeterministic finite automaton (NFA) acquiring part 110, a nondeterministic elements eliminating part 120, a search performing part 130, a communication part 140, and a control part 150 where the nondeterministic elements eliminating part 120 may include a highest probability state determining part 121 and an active state removing part 122. In accordance with an example embodiment of the present invention, at least some of the NFA acquiring part 110, the nondeterministic elements eliminating part 120, the search performing part 130, the communication part 140, and the control part 150 may be program modules communicating with an external system (not illustrated). The program modules may be included in the search server 100 in a form of an operating system, an application program module, and other program module and they may be also stored on known several memory devices physically. Furthermore, the program modules may be stored on remote memory devices communicable to the search server 100. The program modules may include but not be subject to a routine, a subroutine, a program, an object, a component, and a data structure for executing a specific operation or a type of specific abstract data that will be described in accordance with the present invention, but they are not limited to these.

In accordance with an example embodiment of the present invention, the NFA acquiring part 110 performs a function of acquiring NFA corresponding to a regular expression, i.e., a subject to be searched. A case could be introduced that only after the regular expression is converted into NFA, the converted NFA may be acquired by the NFA acquiring part 100. In such case, the conversion course would be performed by a certain regular expression converting part (not illustrated). Further, the other case could be also introduced that a regular expression, acquired by the NFA acquiring part 100, would be also converted into NFA by the NFA acquiring part 100. In general, the NFA may include a set of states S, a set of transitions $\Sigma$, a transition function $\delta$, an initial state $s_0$, and a final state F, where both the initial state and the final state belong to the set of states S. As shown in the present invention, if a string is searched by using a regular expression, input characters may correspond to any ASCII code values. Therefore, the set of transitions E could be $\{0, 1, 2, \ldots, 255\}$.

To convert a regular expression into NFA, a regular expression conversion technology is required. As an example of such a regular expression conversion technology, an article "Regular Expressions into Finite Automata" printed in a book titled "Theoretical Computer Science" authored by A. Bruggemann-Klein could be referred to. (The whole content of the article must be considered to have been merged in this specification.) The article describes how to convert a regular expression into the Glushkov automaton as a relatively simple type of automaton. Of course, the regular expression conversion technology applicable to the present invention would not be limited only to the method described in the article and the present invention could be implemented by applying a variety of modified examples. For example, a regular expression converting part 110 in accordance with one example embodiment of the present invention may convert regular expressions into various types of automata such as Thompson automata, Follow automata, and Antimirov automata. However, the present invention will be explained based on the Glushkov automata to keep the consistency of the detailed explanation.

In accordance with an example embodiment of the present invention, the nondeterministic elements eliminating part 120 performs a function of eliminating nondeterministic elements of a NFA by minimizing the increase in active states during a course of searching a string by using the NFA converted from a regular expression.

More specifically, the highest probability state determining part 121 of the nondeterministic elements eliminating part 120 in accordance with an example embodiment of the present invention may determine a state with a highest probability, i.e., a so-called a high probability state, in the NFA when an input string is entered. Herein, since the highest probability state does not mean a state of having the highest probability among all the states in the NFA but mean a next state to be reached with a highest probability from a current state, there may exist multiple highest probability states. Thus, respective highest probabilities of the multiple highest probability states may be different as well. In addition, the active state removing part 122 of the nondeterministic elements eliminating part 120 in accordance with an example embodiment of the present invention may perform a function of preventing the increase in the active states by changing states and transitions of the NFA so as to prevent the highest probability states from moving to two or more different states. More specifically, the active state removing part 122 may create a new state to be reached from a highest probability state by referring to information on a set of transitions only composed of common transitions if any, among sets of transitions moving from the highest probability state to different states. Accordingly, the active state removing part 122 may perform a function of preventing the highest probability state from moving to two or more different states when characters included in an input string are entered.

In accordance with an example embodiment of the present invention, the search performing part 130 performs a function of searching a string by using the NFA merged by the nondeterministic elements eliminating part 120.

Next, the communication part 140 in accordance with an example embodiment of the present invention may perform a function of allowing the search server 100 to communicate with an external device.

Lastly, the control part 150 in accordance with an example embodiment of the present invention performs a function of controlling data flow among the NFA acquiring part 110, the nondeterministic elements eliminating part 120, and the search performing part 130. In other words, the control part 150 in accordance with the present invention controls the flow of data from/to outside or between the component of the search server 100 to allow the NFA acquiring part 110, the nondeterministic elements eliminating part 120, the search performing part 130, and the communication part 140 to perform their unique functions.

Below explained will be the method for eliminating the nondeterministic elements of the NFA in accordance with the present invention in more detail.

<Step 1>

In the method for eliminating the nondeterministic elements of the NFA, the most important course that affects performance of the NFA is to determine at least one transition that gives the most influence over the increase in the active states. The course may be performed while following a series of next states of being reached with highest probabilities from corresponding current states, in sequence. In detail, the current state is an initial state at a first stage, but a next state, e.g., a $1^{st}$ state, to be reached with a highest probability from the initial state becomes a current state at a second stage and a next state, e.g., a $2^{nd}$ state, to be reached with a highest probability from the $1^{st}$ state becomes a current state at a third stage and the like. That is, the above-mentioned course may be performed while following a series of next states, e.g., $1^{st}$ state, $2^{nd}$ state, and the like, until the next state arrives at a final state.

First of all, if a character in an input string is entered, the nondeterministic elements eliminating part 120 in accordance with the present invention may calculate arrival probabilities which represent possibilities of reaching next states by moving from a certain current state and determine a certain next state with the highest arrival probability as the highest probability state for the certain current state by referring to the calculated arrival probabilities. To get the state with the highest arrival probability from the certain current state, the calculation may be performed only to next states which are connected directly to the certain current state, but it could not be limited only to this. Herein, an arrival probability of reaching a second state by moving from a first state could be calculated as a value by dividing a number of characters capable of transiting the first state to the second state among characters included in the input string (e.g., the acquired number judging from how many characters transiting the first state to the second state are included in the input string) by the total number of characters included therein (e.g., all the characters included in the input string).

For example, the nondeterministic elements eliminating part 120 in accordance with the present invention may initialize an initial state $s_0$ to become a highest probability state by setting an arrival probability of the initial state $s_0$, that cannot but be reached regardless of what input string is, among the states of the NFA, to 1 and the arrival probability of the other states to 0.

<Step 2>

Next, the nondeterministic elements eliminating part 120 in accordance with the present invention may perform a function of determining whether there is a transition that increases the active states among transitions which move the highest probability state to another state, and eliminating a factor of increasing the active states, if such a transition exists, by changing the state and the transition in the NFA.

More specifically, the nondeterministic elements eliminating part 120 in accordance with the present invention may determine whether there exists at least one common transition between a first set of transitions moving the highest probability state to state i and a second set of transitions moving the highest probability state to state j in the NFA. If at least one common transition is determined to exist between the first and second sets of transitions, the nondeterministic elements eliminating part 120 in accordance with the present invention may create a state k, i.e., a state which can be reached from the highest probability state through a set of common transitions including at least one common transition while eliminating the at least one common transition from the first and the second sets of transitions, and the state k may be newly added. Moreover, if all transitions that arrive to the state or the state j are eliminated by the result of elimination of the at least one common transition from the first and the second sets of transitions, the nondeterministic elements eliminating part 120 in accordance with the present invention may delete the state i or the j from the NFA.

<Step 3>

Besides, the nondeterministic elements eliminating part 120 in accordance with the present invention may perform a function of calculating an arrival probability that shows a probability of reaching respective states included in the NFA by moving from the highest probability state, i.e., the current highest probability state, in the NFA when an input string is entered, and updating the current highest probability state to a state with a highest arrival probability which just has been calculated.

Herein, the arrival probability of reaching from the first state to the second state may be calculated by dividing the number of characters transiting the first state to the second state among characters included in the input string by the total number of characters included in the input string.

In addition, the arrival probability calculated at Step in accordance with an example embodiment of the present invention may be added to the arrival probability calculated at Step 1 or the current highest probability state may be updated to a state with a highest arrival probability which is added up as mentioned above.

<Step 4>

Additionally, the nondeterministic elements eliminating part 120 in accordance with the present invention may perform the courses at the Steps 2 and 3 as explained above repeatedly based on the updated current highest probability state. However, because it is not desirable to repeat the courses of eliminating nondeterministic elements infinitely by using the limited memory resources, the efficiency of eliminating the nondeterministic elements can be increased by finishing the courses as follows:

(1) Since a new state may be created while the active state of the NFA is eliminated in accordance with the present invention, the total number of states including the new state may increase. As the search performance of the NFA could be degraded if the total number of states included in the NFA is too high, the nondeterministic elements eliminating part 120 in accordance with the present invention may restore the NFA to an original state, which is a state just before the latest task of eliminating the nondeterministic elements, if the total number of states included in the NFA exceeds a preset value, and finish the courses of eliminating the nondeterministic elements;

(2) In accordance with an example embodiment of the present invention, if the current highest probability state reaches the final state of the NFA, the courses of eliminating the nondeterministic elements may be finished; or (3) In accordance with an example embodiment of the present invention, if the arrival probabilities of all states included in the NFA are larger than 0, the courses of eliminating the nondeterministic elements may be finished.

Figure 3:
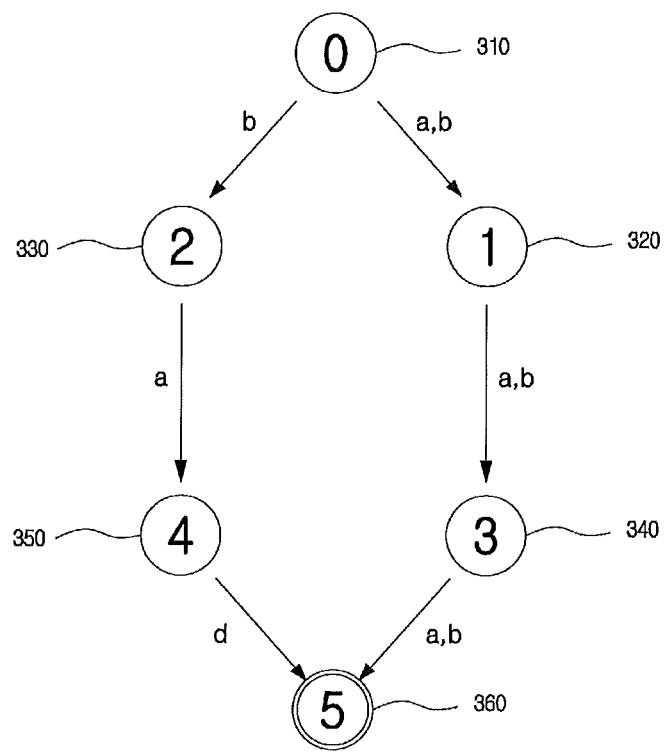
FIGS. 3 to 5 are diagrams exemplarily representing a course of eliminating nondeterministic elements of the NFA in accordance with an example embodiment of the present invention.
Figure 4:
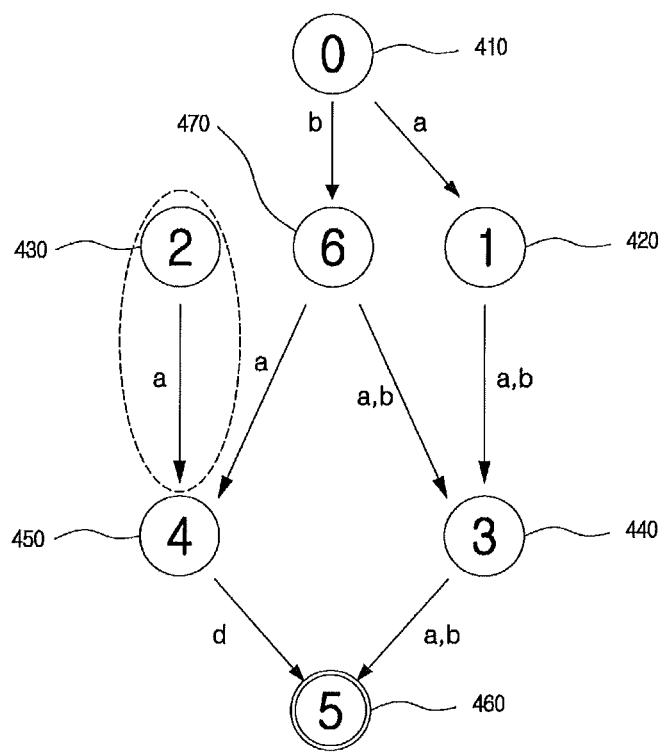
Figure 5:
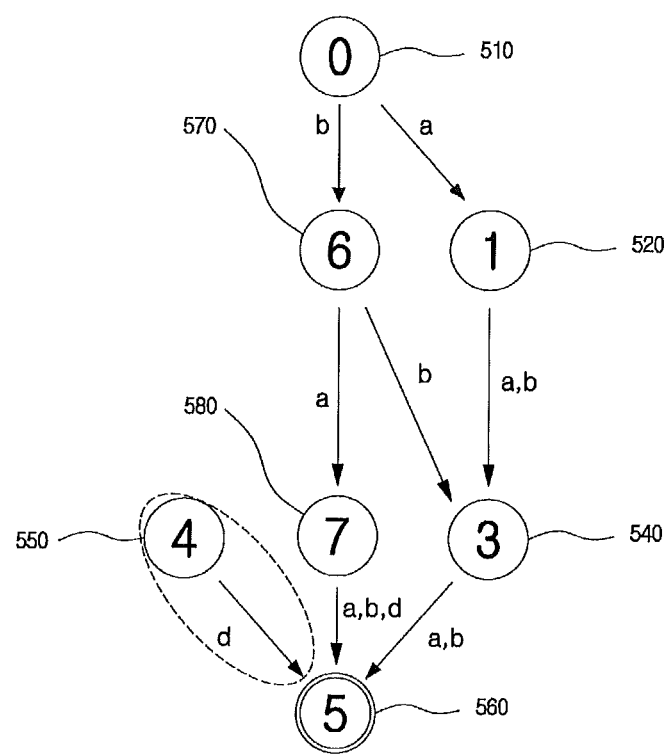

The courses of eliminating the nondeterministic elements of the NFA in accordance with an example embodiment of the present invention will be explained with detailed examples. FIGS. 3 to 5 exemplarily represent the courses of eliminating the nondeterministic elements of the NFA in accordance with an example embodiment of the present invention.

In the example embodiment as shown below, it is assumed that the input string is "gjekf3jmbab0d1f", and a regular expression indicating a string as a subject to be searched in the input string is "[ab]{3}|bad".

First of all, by referring to FIG. 3, the arrival probability of each state included in the NFA may be initialized. More specifically, the arrival probability of state 0 310 as an initial state may be initialized to be 1 and the arrival probabilities of the other states 1 through 5 320 through 360 may be initialized to be 0. Accordingly, the state 0 310 as the initial state may be determined to be the current highest probability state.

In addition, by referring to FIG. 3, because the state 0 310 as the current highest probability state can be moved to a state 1 320 and a state 2 330 through a transition function if a character "b" is inputted at the state 0 310, the number of active states increases from one, i.e., the state 0 310, to two states, i.e., the state 1 320 and the state 2 330. In accordance with an example embodiment of the present invention, a state 6 470 in FIG. 4 may be created as a new state so that, if the character "b" is inputted at the state 0 310, the state 0 310 can be allowed to be moved to the state 6 470 in FIG. 4 instead of allowing the state 0 310 to be moved to the state 1 320 or the state 2 330. Thus, the number of the active states may be maintained to be one, i.e., the state 6 470 in FIG. 4 without increasing the number of the active states. In other words, the next state 6 470 may be created by referring to a set of common transitions, i.e., {b}, composed of only common transitions between a first set of transitions, i.e., {a, b} that move the state 0 310 to the state 1 320 and a second set of transition, i.e., {b} that moves from the state 0 310 to the state 2 330. In FIG. 4, the state 6 470 as a newly created state is illustrated.

Besides, state 2 430 at which there becomes no transition of reaching itself due to the creation of the state 6 370 may be deleted in the NFA.

Next, by referring to FIG. 4, the current highest probability state may be updated from the state 0 410 to a certain next state with the highest arrival probability, i.e., the highest probability among all probabilities reaching from the state 0 410 to respective next states. More specifically, since there are totally 15 characters included in the input string and there is only one character "a" that may move the state 0 410 to state 1 420, the probability of reaching the state 1 420 by moving from the state 0 410 may be calculated to be ⅕15. Because there are totally 15 characters included in the input string and there are two character "b"s that may move the state 0 410 to state 6 470, the probability of reaching the state 6 470 by moving from the state 0 410 may be calculated to be ⅖15. As explained above, on assumption that the state 0 410 is a starting point with the current highest probability, because the arrival probability to the state 6 470 is larger than that to the state 1 420 and those to the other states cannot be larger than the arrival probability to the state 6 470 as well, the current highest probability state may be updated from the state 0 410 to the state 6 470.

Continuously, by referring to FIG. 4, if a character "a" is inputted at the state 6 470, i.e., the current highest probability state, because the state 6 470 can be moved to state 3 440 and state 4 450 by a transition function, the active state increases from one, i.e., the state 6 470, to two, i.e., the state 3 440 and the state 4 450. Thus, in accordance with an example embodiment of the present invention, a state 7 580 may be created as a new state in FIG. 5, if the character "a" is inputted at the state 6 470, the state can be allowed to be moved to the state 7 580 in FIG. 5 instead of allowing the state 6 470 to be moved to the state 3 440 or the state 4 450 in FIG. 4. Thus, the number of the active state may be maintained to be one, i.e., the state 7 580 in FIG. 5, without increasing the number of the active states. In other words, the next state 7 580 may be created by referring to a set of common transitions, i.e., {a}, composed of only common transitions between a first set of transitions, i.e., {a, b} that move the state 6 470 to the state 3 440 and a second set of transition, i.e., {a} that moves from the state 6 470 to the state 4 450. In FIG. 5, the state 7 580 as a newly created state is illustrated.

Besides, the state 4 450 at which there becomes no transition of reaching itself due to the creation of the state 7 580 may be deleted in the NFA.

Next, by referring to FIG. 5, the current highest probability state may be updated from the state 6 570 to a specific next state with the highest arrival probability, i.e., the highest probability among all probabilities reaching from the state 6 570 to respective next states. More specifically, since there are totally 15 characters included in the input string and there are two character "b"s that may move the state 6 570 to state 3 540, the probability of reaching the state 3 540 by moving from the state 6 570 may be calculated to be ⅖15. Because there are totally 15 characters included in the input string and there are only one character "a" that may move the state 6 570 to state 7 580, the probability of reaching the state 7 580 by moving from the state 6 570 may be calculated to be ⅕15. As explained above, on assumption that the state 6 570 is a starting point with the current highest probability, since the arrival probability to the state 3 540 is larger than that to the state 7 580 and those to the other states cannot be larger than the arrival probability to the state 3 540 as well, the current highest probability state may be updated from the state 6 570 to the state 3 540.

In addition, by referring to FIG. 5, because the state 3 which is the current highest probability state is moved to state 5 560 through a transition function if either character "a" or "b" is inputted, the number of the active states remains one as it is. That is, the number of the active states at the state 3 540 is one and that at the state 5 560 is also one. Therefore, if the current highest probability state becomes the state 3 540, it is not necessary to remove the active state.

Continuously, by referring to FIG. 5, the current highest probability state may be updated from the state 3 540 to a particular next state with the highest arrival probability, i.e., the highest probability among all probabilities reaching from the state 3 540 to respective next states. More specifically, since there are totally 15 characters included in the input string and the number of characters, i.e., "a" and "b", capable of moving the state 3 540 to state 5 560 is three, the probability of reaching the state 5 560 by moving from the state 3 540 may be calculated to be ⅗15, i.e., ⅕. Meanwhile, the probability of reaching the rest of states other than the state 5 560 by moving from the state 3 540 may be calculated to be 0. As explained above, on assumption that the state 3 540 is a starting point with the current highest probability, since the arrival probability to the state 5 560 is larger than those to the other states, the current highest probability state may be updated from the state 3 540 to the state 5 560.

Lastly, because the current highest probability state, i.e., the state 5 560, has reached a final state, the courses of eliminating nondeterministic elements of the NFA in accordance with an example embodiment of the present invention may be finished, and the NFA illustrated in FIG. 5 may be provided as a final output as a result of eliminating the nondeterministic elements.

A course of searching a desired string by using the NFA in FIG. 5 whose nondeterministic elements are selectively removed in accordance with one example embodiment of the present invention will be explained below. In an example embodiment as shown below, it is assumed that the input string as a subject to be searched is "gjekf3jmbab0d1f".

Starting from the state 0 510 as an initial state, the NFA in FIG. 5 examines which state moves to the other state(s) while reading characters of the input string one by one in order.

Even though the first character is "g", because there is no transition capable of moving the state 0 510 to any other state responding to the inputted "g", the current state continuously remains the state 0 510. Because there is no transition corresponding to the second character "j" as well, while the current state remains the state 0 510, the next character is read. Accordingly, in such a case, only the state 0 510 remains the state required to test the state transition, i.e., the active state.

Continuously in such a way, on the condition that the current state remains the state 0 510, just after "gjekf3jm" has been inputted, the following character becomes "b". If "b" is inputted, since there is a transition from the state 0 510 to the state 6 570 in the NFA in FIG. 5, the state 0 510 moves to the state 6 570. Accordingly, just after "b" is inputted, the states required to test the state transition, i.e., the active states, are the state 0 510 and the state 6 570, which are totally two.

The following character becomes "a". Since the subsequent character inputted in the NFA of FIG. 5 is "a" and there are transitions moving the state 0 510, i.e., the active state, to a state 1 520, and the state 6 570, i.e., the active state, to a state 7 580, the state 0 510 and the state 6 570 move to the state 1 520 and the state 7 580, respectively. Accordingly, just after "ba" is inputted, the states required to test the state transition, i.e., the active states, are the state 0 510, the state 1 520, and the state 7 580, which are totally three.

The following character becomes "b". Since the subsequent character inputted in the NFA of FIG. 5 is "b" and there are transitions moving the state 0 510, i.e., the active state, to a state 6 570, the state 1 520, i.e., the active state, to a state 3 540, and the state 7 580, i.e., the active state, to a state 5 560, the state 0 510, the state 1 520 and the state 7 580 move to the state 6 570, the state 3 540 and the state 5 560, respectively.

Accordingly, just after "bab" is inputted, the states required to test the state transition, i.e., the active states, are the state 0 510, the state 3 540, the state 5 560 and the state 6 570, which are totally four.

Because it reaches the state 5 560 as the final state of the NFA in FIG. 5, it can be treated to find the desired string, i.e., "bab", in the given input string.

FIG. 6 is a diagram showing the result of comparing the method for searching the desired string by using general NFA in FIG. 1 with that by using the NFA whose nondeterministic elements are selectively eliminated in accordance with an example embodiment of the present invention. By referring to FIG. 6, it can be found that at least one or more active states per stage are reduced by using the NFA in FIG. 5 than in FIG. 1. According to the method for eliminating the nondeterministic elements of the NFA in accordance with the present invention as confirmed in FIG. 6, when a string is searched, an effect of reducing memory usage and improving search speed could be achieved.

The course of acquiring and merging the NFA and searching the desired string was explained above in center of the example embodiment of being performed in the server, but the configuration of the present invention is not limited to the example embodiment and a series of the courses could be performed even in a user's terminal (not illustrated) at any time. For example, a course of acquiring and merging the NFA and searching the desired string by a certain application installed in the terminal could be performed.

In accordance with the present invention, the effect of reducing the memory usage and improving the search speed can be achieved because the number of active states of the NFA can be reduced and the nondeterministic elements of the NFA can be selectively eliminated.

In accordance with the present invention, it could be possible to increase the efficiency of eliminating the nondeterministic elements to the maximum by considering respective degrees of the importance of eliminating the elements.

The embodiments of the present invention as explained above can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for searching a requested string within at least one input string on a computer system comprising steps of:
   a processor acquiring at least one input string, and acquiring information on a requested string to be searched in the at least one input string;
   acquiring a nondeterministic finite automata (NFA) based on information on the requested string;
   the processor selectively eliminating one or more nondeterministic elements from the acquired NFA to thereby create a revised NFA by:
   (a)(i) determining a specific state calculated to have a highest arrival probability through a transition from a current state among all states in the NFA as a current highest probability state based on a number of occurrences of at least one character in the at least one input string; or (ii) determining an initial state as a current highest probability state;
   (b) determining whether there exists at least one common transition between a first set of transitions including at least one transition moving the current highest probability state to a state i and a second set of transitions including at least one transition moving the current highest probability state to a state j in the NFA; and
   (c) excluding the at least one common transition between the first and the second sets of transitions, if being determined to exist, and creating a state k which is arrived as a result of moving from the current highest probability state through a set of common transitions composed of the at least one common transition, wherein the state k is newly added in the NFA;
   the processor searching the requested string in the at least one input string by using the revised NFA.

2. The method of claim 1, wherein creating the revised NFA further comprises the steps of:
   (d) calculating a probability of reaching at least one state reachable by moving from the current highest probability state, and updating the current highest probability state from the specific state to a certain state with the highest probability calculated at the step (d);
   (e) determining whether there exists at least one common transition between a third set of transitions including at least one transition moving the updated current highest probability state, i.e., the certain state, to a state l and a fourth set of transitions including at least one transition moving the certain state to a state m; and
   (f) excluding the at least one common transition between the third and the fourth sets of transitions, if being determined to exist, and creating a state n which is arrived as a result of moving from the certain state through a set of common transitions composed of the at least one common transition, wherein the state n is newly added in the NFA.

3. The method of claim 1, wherein, at the step (a)(ii), a probability of reaching the current highest probability state by moving from the current state is determined to be a value acquired by dividing a number of characters transiting the current state to the current highest probability state among all characters included in an input string including a subject to be searched by a total number of characters included in the input string.

4. The method of claim 2, wherein, at the step (d), a probability of reaching the at least one state reachable by moving from the current highest probability state is determined to be a value acquired by dividing a number of characters transiting the current highest probability state to the at least one state reachable by moving from the current highest probability state among all characters included in the input string by a total number of characters included in the input string.

5. The method of claim 1, wherein, at the step (c), a state without any transition reaching itself by moving from any other states among all the states in the NFA is removed.

6. The method of claim 1, further comprising steps of:
(d) calculating a probability of reaching at least one state reachable by moving from the current highest probability state, and updating the current highest probability state from the specific state to a certain state with the highest probability calculated at the step (d); and
(g) finishing elimination of nondeterministic elements when the updated current highest probability state, i.e., the certain state, is a final state of the NFA.

7. The method of claim 2, further comprising a step of:
(h) restoring the NFA to an original state, which is a state just before the latest task of eliminating the nondeterministic elements, i.e., just before the step (f) is performed, if the number of all the states included in the NFA exceeds a preset value due to the creation of the state n at the step (f).

8. A method for searching for a requested string within at least one input string on a computer system comprising steps of:
a processor acquiring at least one input string, and acquiring information on a requested string to be searched in the at least one input string;
acquiring a nondeterministic finite automata (NFA) based on information on the requested string;
the processor selectively eliminating nondeterministic elements from the acquired NFA to thereby create a revised NFA by:
(a) determining whether there exists at least one common transition between a first set of transitions including at least one transition moving an initial state to a state i and a second set of transitions including at least one transition moving the initial state to a state j in the NFA;
(b) excluding the at least one common transition between the first and the second sets of transitions, if being determined to exist, and creating a state k which is arrived as a result of moving from the initial state through a set of common transitions composed of the at least one common transition, wherein the state k is newly added in the NFA; and
(c) calculating a probability of reaching at least one state reachable by moving from the initial state, and determining a certain state with a calculated highest probability to be a highest probability state based on a number of occurrences of at least one character in the at least one input string.

9. The method of claim 8, further comprising the steps of:
(d) determining whether there exists at least one common transition between a third set of transitions including at least one transition moving the highest probability state, i.e., the certain state, to a state l and a fourth set of transitions including at least one transition moving the certain state to a state m; and
(e) excluding the at least one common transition between the third and the fourth sets of transitions, if being determined to exist, and creating a state n which is arrived as a result of moving from the certain state through a set of common transitions composed of the at least one common transition, wherein the state n is newly added in the NFA.

10. The method of claim 8, wherein, at the step (c), the probability of reaching the at least one state reachable by moving from the initial state is determined to be a value acquired by dividing a number of characters transiting the initial state to the at least one state reachable by moving from the initial state among all characters included in the input string by a total number of characters included in the input string.

11. A server for selectively eliminating nondeterministic elements of nondeterministic finite automata (NFA) comprising:
a processor;
an electronic memory storing at least one input string and information on a requested string to be searched in the at least one input string;
wherein said electronic memory also stores a nondeterministic finite automata (NFA) based on information on the requested string;
wherein the processor selectively eliminates nondeterministic elements from the acquired NFA to thereby create a revised NFA by:
(i) determining a specific state calculated to have a highest arrival probability through a transition from a current state among all states in the NFA as a current highest probability state (i) based on a number of occurrences of at least one character in the at least one input string; or (ii) determining an initial state as a current highest probability state;
determining whether there exists at least one common transition between a first set of transitions including at least one transition moving the current highest probability state to a state i and a second set of transitions including at least one transition moving the current highest probability state to a state j in the NFA; and
excluding the at least one common transition between the first and the second sets of transitions, if being determined to exist, and creating a state k which is arrived as a result of moving from the current highest probability state through a set of common transitions composed of the at least one common transition, wherein the state k is newly added in the NFA;
the processor searching the requested string in the at least one input string by using the revised NFA.

12. The server of claim 11, wherein the processor further calculates a probability of reaching at least one state reachable by moving from the current highest probability state, and updates the current highest probability state from the specific state to a certain state with the calculated highest probability; and
wherein the processor further determines whether there exists at least one common transition between a third set of transitions including at least one transition moving the updated current highest probability state, i.e., the certain state, to a state l and a fourth set of transitions including at least one transition moving the certain state to a state m; and
wherein the processor excludes the at least one common transition between the third and the fourth sets of transitions, if being determined to exist, and creates a state n which is arrived as a result of moving from the certain state through a set of common transitions composed of the at least one common transition, wherein the state n is newly added in the NFA.

13. The server of claim 11, wherein a probability of reaching the current highest probability state by moving from the current state is determined to be a value acquired by dividing a number of characters transiting the current state to the current highest probability state among all characters included in an input string including a subject to be searched by a total number of characters included in the input string.

14. The server of claim 12, wherein a probability of reaching the at least one state reachable by moving from the current highest probability state is determined to be a value acquired by dividing a number of characters transiting the current highest probability state to the at least one state reachable by moving from the current highest probability state among all characters included in the input string by a total number of characters included in the input string.

15. The server of claim 11, wherein a state without any transition reaching itself by moving from any other states among all the states in the NFA is removed.

16. The server of claim 11, wherein the processor further calculates a probability of reaching at least one state reachable by moving from the current highest probability state, and updates the current highest probability state from the specific state to a certain state with the calculated highest probability; and wherein the processor further finishes the courses of eliminating nondeterministic elements, if the updated current highest probability state, i.e., the certain state, is a final state of the NFA.

17. The server of claim 12, wherein the processor further restores the NFA to an original state, which is a state just before the latest task of eliminating the nondeterministic elements, if the number of all the states included in the NFA exceeds a preset value due to the creation of the state n.

18. A server for selectively eliminating nondeterministic elements of nondeterministic finite automata (NFA) comprising:
a processor;
an electronic memory storing at least one input string and information on a requested string to be searched in the at least one input string;
wherein said electronic memory also stores a nondeterministic finite automata (NFA) based on information on the requested string;
wherein the processor selectively eliminates nondeterministic elements from the acquired NFA to thereby create a revised NFA by:
determining whether there exists at least one common transition between a first set of transitions including at least one transition moving an initial state to a state i and a second set of transitions including at least one transition moving the initial state to a state j in the NFA;
excluding the at least one common transition between the first and the second sets of transitions, if being determined to exist, and creates a state k which is arrived as a result of moving from the initial state through a set of common transitions composed of the at least one common transition, wherein the state k is newly added in the NFA; and
calculating a probability of reaching at least one state reachable by moving from the initial state, and determines a certain state with a calculated highest probability to be a highest probability state based on a number of occurrences of at least one character in the at least one input string;
the processor searching the requested string in the at least one input string by using the revised NFA.

19. The server of claim 18, wherein the processor further determines whether there exists at least one common transition between a third set of transitions including at least one transition moving the highest probability state, i.e., the certain state, to a state l and a fourth set of transitions including at least one transition moving the certain state to a state m; and
excludes the at least one common transition between the third and the fourth sets of transitions, if being determined to exist, and creates a state n which is arrived as a result of moving from the certain state through a set of common transitions composed of the at least one common transition, wherein the state n is newly added in the NFA.

20. The server of claim 18, wherein the probability of reaching the at least one state reachable by moving from the initial state is determined to be a value acquired by dividing a number of characters transiting the initial state to the at least one state reachable by moving from the initial state among all characters included in the input string by a total number of characters included in the input string.

21. A terminal for selectively eliminating nondeterministic elements of nondeterministic finite automata (NFA) comprising:
a processor;
an electronic memory storing at least one input string and information on a requested string to be searched in the at least one input string;
wherein said electronic memory also stores a nondeterministic finite automata (NFA) based on information on the requested string;
wherein the processor selectively eliminates nondeterministic elements from the acquired NFA to thereby create a revised NFA by:
(i) determining a specific state calculated to have a highest arrival probability through a transition from a current state among all states in the NFA as a current highest probability state (i) based on a number of occurrences of at least one character in the at least one input string; or (ii) determining an initial state as a current highest probability state;
determining whether there exists at least one common transition between a first set of transitions including at least one transition moving the current highest probability state to a state i and a second set of transitions including at least one transition moving the current highest probability state to a state j in the NFA; and
excluding the at least one common transition between the first and the second sets of transitions, if being determined to exist, and creating a state k which is arrived as a result of moving from the current highest probability state through a set of common transitions composed of the at least one common transition, wherein the state k is newly added in the NFA;
the processor searching the requested string in the at least one input string by using the revised NFA.

22. A terminal for selectively eliminating nondeterministic elements of nondeterministic finite automata (NFA) comprising:
a processor;
an electronic memory storing at least one input string and information on a requested string to be searched in the at least one input string;
wherein said electronic memory also stores a nondeterministic finite automata (NFA) based on information on the requested string;

wherein the processor selectively eliminates nondeterministic elements from the acquired NFA to thereby create a revised NFA by:
- determining whether there exists at least one common transition between a first set of transitions including at least one transition moving an initial state to a state i and a second set of transitions including at least one transition moving the initial state to a state j in the NFA;
- excluding the at least one common transition between the first and the second sets of transitions, if being determined to exist, and creates a state k which is arrived as a result of moving from the initial state through a set of common transitions composed of the at least one common transition, wherein the state k is newly added in the NFA; and
- calculating a probability of reaching at least one state reachable by moving from the initial state, and determines a certain state with a calculated highest probability to be a highest probability state based on a number of occurrences of at least one character in the at least one input string;

the processor searching the requested string in the at least one input string by using the revised NFA.

23. A computer-readable recording medium for recording a program to execute the method of claim 1.

* * * * *